United States Patent
Huang

(10) Patent No.: US 8,213,739 B2
(45) Date of Patent: Jul. 3, 2012

(54) METHOD AND SYSTEM OF PERFORMING DETECTION ON AN IMAGING DEVICE

(75) Inventor: Chung-Hsiung Huang, Taipei (TW)

(73) Assignee: Ability Enterprise Co., Ltd., Taipei (TW)

( * ) Notice: Subject to any disclaimer, the term of this patent is extended or adjusted under 35 U.S.C. 154(b) by 423 days.

(21) Appl. No.: 12/690,615

(22) Filed: Jan. 20, 2010

(65) Prior Publication Data
US 2011/0115493 A1    May 19, 2011

(30) Foreign Application Priority Data

Nov. 13, 2009 (TW) ................................. 98138532 A

(51) Int. Cl.
G06K 9/40     (2006.01)
H01L 21/8238  (2006.01)

(52) U.S. Cl. .................... 382/275; 382/145; 438/217

(58) Field of Classification Search .................. 382/100, 382/103, 106, 108, 141–154, 168, 172, 173, 382/181, 193–194, 209–224, 232, 254, 274, 382/276, 305, 312, 275; 324/750.07, 754.03, 324/760.01, 754.28; 702/94; 250/307; 435/6; 438/217

See application file for complete search history.

(56) References Cited

U.S. PATENT DOCUMENTS

| | | | |
|---|---|---|---|
| 6,710,607 B2 * | 3/2004 | Fujii et al. ................. | 324/754.03 |
| 7,173,445 B2 * | 2/2007 | Fujii et al. ................. | 324/754.28 |
| 7,545,162 B2 * | 6/2009 | Chung ....................... | 324/760.01 |
| 7,755,376 B2 * | 7/2010 | Ding .......................... | 324/750.07 |
| 7,928,378 B2 * | 4/2011 | Kimba et al. ................ | 250/307 |
| 8,060,329 B2 * | 11/2011 | Namioka et al. ............. | 702/94 |
| 2003/0068626 A1 * | 4/2003 | Wang et al. ................. | 435/6 |

* cited by examiner

*Primary Examiner* — Seyed Azarian

(74) *Attorney, Agent, or Firm* — Stout, Uxa, Buyan & Mullins, LLP

(57) ABSTRACT

In a method and system of detecting abnormality in an imaging device, multiple digital data are received in sequence from the imaging device via at least one data output pin. The multiple digital data correspond respectively to multiple pixel data. Subsequently, the multiple digital data for a specific pin are compared to determine whether they are, or how many of them are, the same. Accordingly, the specific pin is determined as abnormal when the number of the same digital data exceeds a predetermined value.

22 Claims, 3 Drawing Sheets

METHOD AND SYSTEM OF PERFORMING DETECTION ON AN IMAGING DEVICE

CROSS-REFERENCE TO RELATED APPLICATIONS

The entire contents of Taiwan Patent Application No. 098138532, filed on Nov. 13, 2009, from which this application claims priority, are incorporated herein by reference.

BACKGROUND OF THE INVENTION

1. Field of the Invention

The present invention generally relates to an imaging device, and more particularly to a method and system of performing detection on an image sensor module.

2. Description of Related Art

A semiconductor image sensor (e.g., charge coupled device (CCD) or complementary metal oxide semiconductor (CMOS) image sensor) is widely used in, for example, photographic cameras, video cameras and other electric devices, to convert images of visible light into electronic signals that can be stored, transmitted or displayed.

For fabricating an image sensor module, the image sensor is combined with other electronic elements or circuits by adhering and fixing, followed by passage through many processing steps. The image sensor module usually communicates with rear stage components, such as, for example, an image processor or a display, through data bus pins for transferring data. In the fabricating process of the image sensor module, every processing step is crucial to the normal operation of the image sensor. One faulty step may result in an image sensor that outputs abnormal image data.

Electronic equipment such as oscilloscopes are conventionally applied to detect the abnormality of the image sensor module. However, detection in this way costs substantial time, and the operators need to be trained before they are capable of correctly and quickly detecting the abnormality. As a result, this type of method, while usually adaptable to unusual detection situations, is not suitable for quality detection in mass production.

For the reason that the conventional apparatus and methods are not capable of performing effective and economical detection on the image sensor module, a need has arisen to propose a novel detection scheme for improving production efficiency.

SUMMARY OF THE INVENTION

In view of the foregoing, it is an object of the embodiment of the present invention to provide a method and system of performing detection on an imaging device (e.g., an image sensor module), which may correctly and economically perform automatic detection on data output pins of the imaging device, therefore increasing production efficiency.

According to a detection method as disclosed in one embodiment of the present invention, a number of digital data are firstly received in sequence from the imaging device via at least one data output pin, where the digital data correspond respectively to a number of pixel data. Subsequently, the digital data for the specific pin are compared to determine whether, or an extent to which, part or all of the plurality of digital data are the same. Accordingly, the pin is determined as abnormal when the number of the same digital data exceeds a predetermined value.

According to a detection system as disclosed in another embodiment of the present invention, the detection system includes an input segment and a comparing segment. The input segment receives a number of digital data in sequence from the imaging device via at least one data output pin, where the digital data correspond respectively to a number of pixel data. The comparing segment compares the digital data for the specific pin to determine whether, or an extent to which, part or all of the plurality of digital data are the same. Accordingly, the pin is determined as abnormal when the number of the same digital data exceeds a predetermined value.

DETAILED DESCRIPTION OF THE INVENTION

Figure 1:
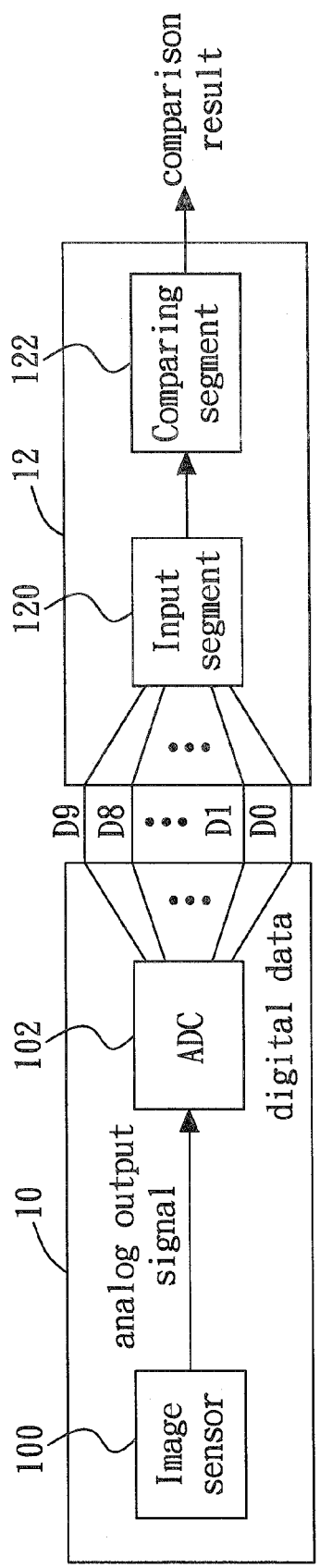
FIG. 1 shows a block diagram of a system of performing detection on an imaging device according to one embodiment of the present invention.

FIG. 1 shows a block diagram of a detection system 12 for detecting abnormality in an imaging device 10 according to one embodiment of the present invention. In the embodiment, the imaging device 10 is an image sensor module, which may be applied in photographic cameras, video cameras or other electric devices.

In the embodiment, the imaging device 10 primarily includes an image sensor 100 and an analogue-to-digital converter (ADC) 102. Specifically, the image sensor 100 may be, for example, a CMOS sensor, a CCD or other sensors. The ADC 102 converts an analog output (e.g., signal) from the image sensor 100 to digital data (e.g., with a digital format). The ADC 102 and the image sensor 100 are both built in the same integrated chip. The digital data generated from the ADC 102 is transferred to the detection system 12 through data output or bus pins. As shown in FIG. 1, in an embodiment of data bus pins comprising ten pins, [D9 D8 D7 D6 D5 D4 D3 D2 D1 D0], the data bus pins may be denoted as D[9:0].

In the embodiment, the detection system 12 primarily includes an input segment 120 and a comparing segment 122. Specifically, the input segment 120 receives multiple digital data in sequence from the imaging device 10 via the data bus pins D[9:0], and the multiple digital data correspond respectively to multiple pixel data. In other words, in the embodiment, each pixel data has ten bits, and each bit is transferred to the input segment 120 via a specific pin D. For example, each pixel data bit 3 of the digital data is transferred to the input segment 120 in sequence through the pin D[3]. The comparing segment 122 compares the multiple digital data for the specific pin to determine their sameness (e.g., whether or not, or an extent to which, part or all of the digital data are the same). For example, a number of digital data (e.g., the pixel data bit 3) transferred in sequence via the specific pin D[3] are compared by the comparing segment 122. One or more comparison results are outputted from the comparing segment 122. In the embodiment, the comparing segment 122 outputs ten comparison results, which respectively correspond to the pins D[9:0], for indicating normality/abnormality of each pin.

Figure 2:
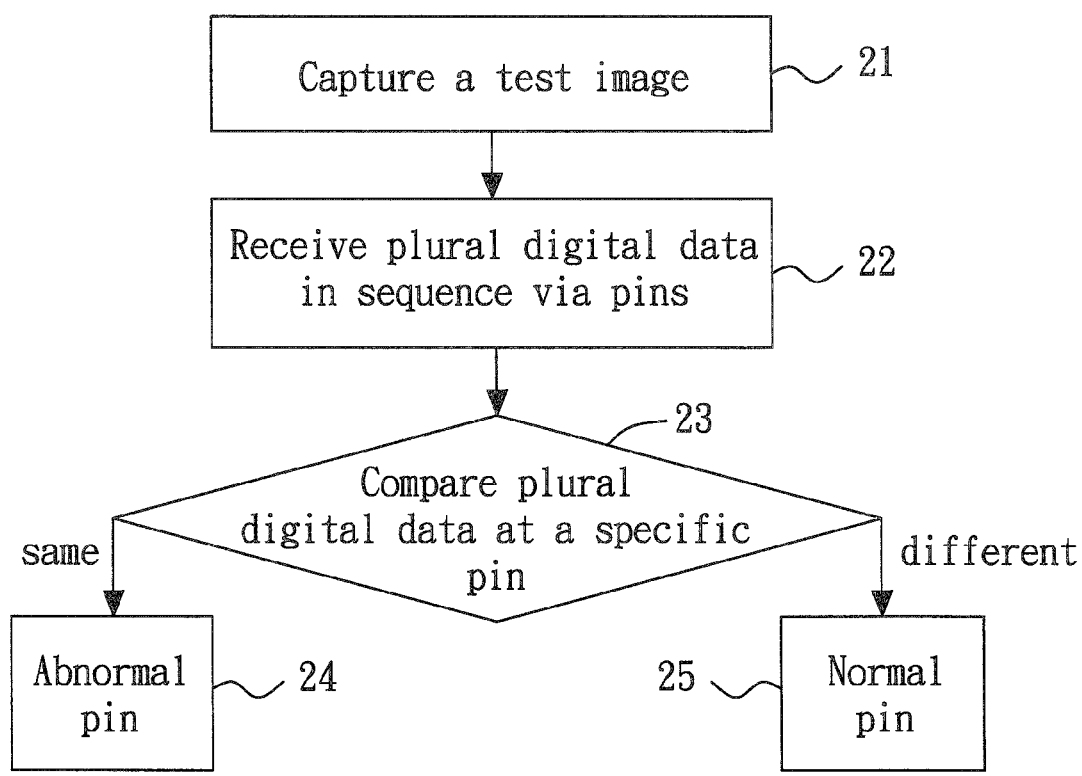
FIG. 2 is a flow diagram that illustrates a method of performing detection on the imaging device by the detection system according to one embodiment of the present invention.
Figure 3:
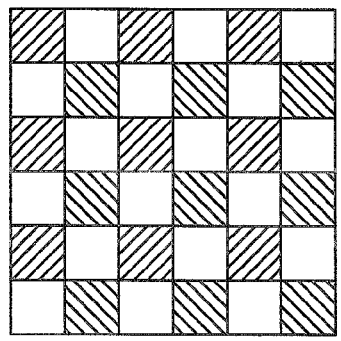
FIG. 3 shows a prefabricated array pattern.

FIG. 2 is a flow diagram that illustrates a method of detecting abnormality in the imaging device 10 by the detection system 12 according to one embodiment of the present invention. Firstly, a test image is captured in step 21. For instance, a photo image is captured under a general environment or luminance. Generally speaking, the test image is preferably a non-monotonic image. For example, the test image may be an image that is not entirely dark, not entirely bright and content varied, or the test image may be a prefabricated array pattern as exemplified in FIG. 3 or the Gretag Macbeth ColorChecker Color Rendition Chart.

Subsequently, in step 22, the input segment 120 receives multiple digital data in sequence from the pins D[9:0]. As described above, each digital data is associated with corresponding pixel data. In the embodiment, the input segment 120 receives the digital data (pixel data) of all pixels contained in the test image via the pins D9 to D0 (the quantity of the pins is ten in the embodiment). However, in other embodiments, the input segment 120 may receive partial pixel data of the test image or may receive the digital data through one or more pins.

Afterward, in step 23, the comparing segment 122 compares multiple digital data at a specific pin to determine their sameness (e.g., whether or not, or an extent to which, part or all of the plurality of digital data are the same). In the embodiment, with respect to a specific pin (e.g., pin D[3]), the comparing segment 122 compares all the digital data received via the specific pin (e.g., the pixel data bit 3). It indicates that the specific pin (or circuits or elements electrically coupled to the specific pin) may be abnormal such as in the case of it being a short-circuit or open-circuit, if all the digital data are found as "0" or "1" based on the comparison results (in step 24); otherwise, it indicates that the specific pin may be normal (in step 25). Generally speaking, a threshold value may be predetermined in the comparing segment 122 considering an erroneous judgment caused by noise in the detection system 12, the imaging device 10 or the pin connected between the detection system 12 and the imaging device 10. The specific pin is determined as abnormal when the number of the same digital data exceeds the predetermined value (e.g., more than 95% of the total digital data); otherwise, the specific pin is determined as normal.

Figure 4:
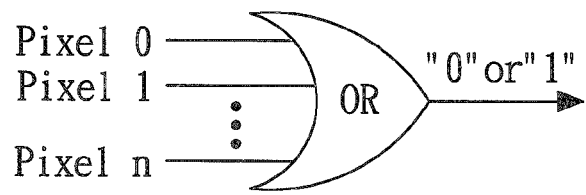
FIG. 4 shows a logic OR gate for comparing a number of digital data at a pin.

As shown in FIG. 4, according to a preferred embodiment of the present invention, a logic OR gate is used to compare a number of digital data at a pin for determining whether the digital data all are "0." A condition of all the pixel data (e.g., pixel 0 to pixel n) being "0" with the result generated from the logic OR gate being "0" indicates that the specific pin may be abnormal; otherwise, a condition where the result generated from the logic OR gate is "1" is indicative of the specific pin being normal. Due to the large amount of the pixel data in a typical test image, it is not feasible to implement the logic OR gate directly with hardware or software. Accordingly, in the preferred embodiment, the logic OR gate may be implemented by the following algorithm instead:

```
for (y=0;y<HEIGHT;y++)
{
    for (x=0;x<WIDTH;x++)
    {
        PixelData=PixelArray[X][Y];
        DataBusData | =PixelData;
    }
}
``` where HEIGHT represents the height of the test image, and WIDTH represents the width of the test image.

Figure 5:
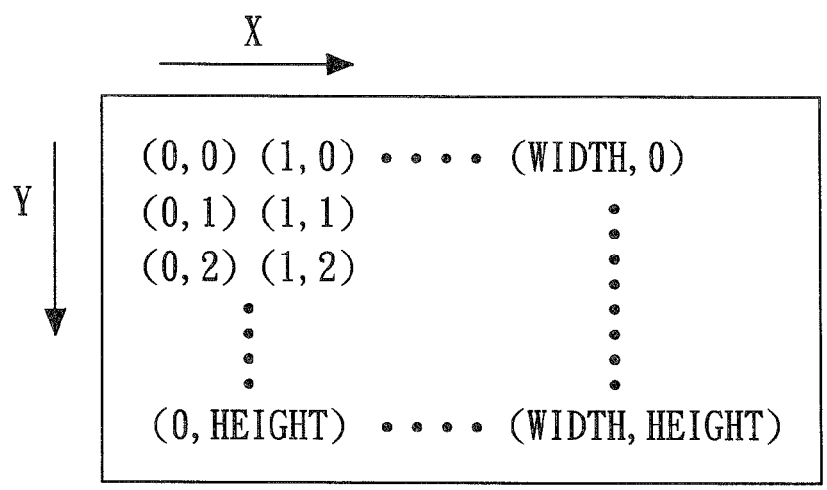
FIG. 5 exemplifies pixels in a test image.

In the algorithm, the pixel data PixelArray[X] [Y] are represented in matrix form, and respectively correspond to the pixels of the test image shown in FIG. 5. According to the algorithm, two pixel data are firstly compared by the logic OR operation to generate an intermediate comparison value. In the next iteration, the intermediate comparison value and the succeeding pixel data are compared by the logic OR operation to generate a new intermediate comparison value. The operations are iterated until a comparison result of "1" occurs or all pixel data have been compared. According to the algorithm as disclosed in the preferred embodiment of the present invention, the logic OR operation is performed by iteration to save substantial circuit area.

According to another preferred embodiment of the present invention, the logic OR operation is performed using iteration. Moreover, multiple color sub-pixels (e.g., blue (B), green (G) and red (R)) are further considered in the present embodiment according to the following algorithm:

```
for (y=0;y<iHEIGHT;y++)
{
    buf_line=y*iWIDTH;
    pixel_line=buf_line*3;
    for (x=0;x<iWIDTH;x++)
    {
        pixel=pixel_line+x*3;
        B=*(m_buf+pixel);
        G=*(m_buf+pixel+1);
        R=*(m_buf+pixel+2);
        DataBusData | =( B | G | R);
    }
}
```

According to the algorithm, the B, G and R sub-pixels of the same pixel are firstly operated by the logic OR operation to generate a color comparison result. Subsequently, all the color comparison results are operated by the logic OR gate using iteration to generate a final comparison result. A final comparison result "0" may indicate an abnormal pin, and a final comparison result "1" may indicate a normal pin.

According to the embodiments described above, the disclosed method and system of performing detection on the imaging device may correctly and economically perform automatic detection for a data bus issue (e.g., abnormality) of the imaging device (such as the image sensor module) during, for example, incoming inspection or fault analysis, therefore substantially increasing the production efficiency. The system and method described herein may be implemented by software, hardware or their combination.

Although specific embodiments have been illustrated and described, it will be appreciated by those skilled in the art that various modifications may be made without departing from the scope of the present invention, which is intended to be limited solely by the appended claims.

What is claimed is:

1. A method of performing detection on an imaging device, comprising:
   receiving a plurality of digital data in sequence from the imaging device via at least one data output pin, the plurality of digital data corresponding respectively to a plurality of pixel data each comprising a digital format; and
   comparing the plurality of digital data for the specific pin to determine an extent to which they are the same;

wherein the comparison step comprises both comparing the plurality of digital data of each said pixel data by a logic function for generating a comparison result and comparing a plurality of the comparison results by a logic function for generating a final comparison result, and wherein the pin is determined as abnormal when the number of the same digital data exceeds a predetermined value and the final comparison result is a value comprising a digital format.

2. The method of claim 1, wherein the data output pin receives all of the digital data of a test image.

3. The method of claim 1, wherein the imaging device comprises an image sensor.

4. The method of claim 3, wherein the imaging device further comprises an analogue-to-digital converter (ADC) for converting an analog output signal of the image sensor to the digital data.

5. The method of claim 1, further comprising:
capturing a non-monotonic test image by the imaging device before receiving the plurality of digital data.

6. The method of claim 5, wherein the captured test image is a prefabricated array pattern.

7. The method of claim 1, wherein:
the comparing comprises determining whether the plurality of digital data are all the same; and
the pin is determined as being in an abnormal short-circuit or open-circuit condition when all of the digital data are "0."

8. The method of claim 7, wherein the comparison step comprises:
comparing the plurality of digital data by a logic OR, whereby a resultant "0" indicates all of the digital data are "0."

9. The method of claim 8, wherein the comparison step by the logic OR comprises:
comparing two of the plurality of digital data by the logic OR for generating an intermediate comparison result;
comparing the intermediate comparison result and another one of the plurality of digital data by the logic OR for generating another intermediate comparison result; and
repeating the previous step until a "1" has resulted or all of the digital data have been compared.

10. The method of claim 1, wherein each of the pixel data corresponds to a plurality of color digital data.

11. The method of claim 10, wherein the comparison step comprises:
comparing the plurality of color digital data of each said pixel data by the logic OR for generating a color comparison result; and
comparing a plurality of the color comparison results by the logic OR for generating a final comparison result;
wherein the pin is determined as abnormal when the final comparison result is "0."

12. A system of performing detection on an imaging device, comprising:
an input segment arranged to receive a plurality of digital data in sequence from the imaging device via at least one data output pin, the plurality of digital data corresponding respectively to a plurality of pixel data each comprising a digital format; and
a comparing segment configured to compare the plurality of digital data for the specific pin to determine an extent to which they are the same, the comparing segment comprising a logic unit which is operable to compare the plurality of color digital data of each said pixel data for generating a comparison result and to compare a plurality of the comparison results for generating a final comparison result;
wherein the system is able to determine the pin as abnormal when the number of the same digital data exceeds a predetermined value and the final comparison result is a value comprising a digital format.

13. The system of claim 12, wherein the data output pin is coupled to receive all of the digital data of a test image.

14. The system of claim 12, wherein the imaging device comprises an image sensor.

15. The system of claim 14, wherein the imaging device further comprises an analogue-to-digital converter (ADC) for converting an analog output signal of the image sensor to the digital data.

16. The system of claim 12, the input segment being arranged to receive the plurality of digital data after the imaging device has captured a non-monotonic test image.

17. The system of claim 16, wherein the captured test image is a prefabricated array pattern.

18. The system of claim 12, wherein:
the comparing segment is configured to determine whether the plurality of digital data are all the same; and
the comparing segment determines the pin as being an abnormal short-circuit or open-circuit when all of the digital data are "0."

19. The system of claim 18, wherein the comparing segment comprises:
a logic OR unit for comparing the plurality of digital data, whereby a resultant "0" indicates all of the digital data are "0."

20. The system of claim 19, wherein the logic OR unit comprises a two-input logic OR gate constructed to compare two of the plurality of digital data for generating an intermediate comparison result, compare the intermediate comparison result and another one of the plurality of digital data for generating another intermediate comparison result, and repeat the previous step until a "1" has resulted or all of the digital data have been compared.

21. The system of claim 12, wherein each of the pixel data corresponds to a plurality of color digital data.

22. The system of claim 21, wherein the comparing segment comprises a logic OR unit which is operable to compare the plurality of color digital data of each said pixel data for generating a color comparison result and to compare a plurality of the color comparison results for generating a final comparison result, and wherein the system is configured to determine the pin as abnormal when the final comparison result is "0."

* * * * *